United States Patent Office 3,369,860
Patented Feb. 20, 1968

3,369,860
PROCESS FOR RECOVERING
BERYLLIUM VALUES
Joseph P. Surls, Jr., Walnut Creek, Calif., assignor to The Dow Chemical Company, Midland, Mich., a corporation of Delaware
No Drawing. Filed Oct. 24, 1963, Ser. No. 318,523
12 Claims. (Cl. 23—18)

This invention relates to an improved process for winning beryllium from its ores and more particularly is concerned with a novel, controlled, economical process for readily recovering beryllium from beryl.

It is a principal object of the present invention to provide a novel process for obtaining beryllium values from beryllium containing source materials wherein controlled reaction conditions assure high beryllium recoveries as well as gross separation of the beryllium from aluminum and iron values normally associated therewith in the source material.

It is a further object of the present invention to provide a novel process for obtaining beryllium values from beryl and other beryllium ores which process employs moderate reaction conditions.

It is another object of the present process to provide a process for beryllium recovery which is economical and carried out in a minimal number of procedural steps.

These and other objects and advantages readily will become apparent from the detailed description in the specification presented hereinafter.

In general, the present process comprises reacting a beryllium containing source material with a base, digesting the residual mass with a mineral acid under controlled conditions thereby to produce a filterable slurry, and separating the acid solution containing dissolved beryllium values from the solid residue.

More particularly in the present process a silicate or oxide beryllium containing mineral is admixed with an alkali metal oxide, alkali metal hydroxide, mixture of alkaline earth metal hydroxide and alkaline earth oxide or mixture of alkali metal hydroxide and alkali metal carbonate at a weight ratio of from about 1 to about 2, expressed as NaOH equivalent/beryl.

The base usually is employed as a concentrated solution or slurry to assure intimate contact with the beryllium source.

Beryl is beryllium aluminum silicate corresponding to the empirical formula $3BeO \cdot Al_2O_3 \cdot 6SiO_2$.

The term "alkali metal" as used herein is meant to include sodium, potassium, cesium and rubidium. The term "alkaline earth metal" as used herein is meant to include magnesium, calcium, strontium and barium.

The resulting mixture is heated at a temperature of from about 200 to about 350° C. or higher for a period of from about 1 to about 4 hours or more.

The so-reacted mass ordinarily is leached with water to remove excess of the base material along with a portion of the water-soluble silicon containing materials. The beryllium values in the mass are substantially water-insoluble at this stage and only negligible amounts of beryllium are lost to the water wash. The prime purpose for the water leach is to remove the excess of the basic reactant so as not to require excess mineral acid in the acid leaching of the roast cake. It is to be understood, however, that the cake can be treated with mineral acid only and the water rinse be eliminated if desired.

The roast cake or roasted and water-washed cake is extracted with a mineral acid, for example hydrochloric, hydrobromic, nitric, sulfuric, sulfurous or a like acid, which does not complex beryllium. The amount of acid utilized is such so as to provide a pH from about 1 to about 4.5 in the leach liquor. Ordinarily, to obtain this pH the amount of acid to cake employed, expressed as weight ratios of $H_2SO_4$/beryl, ranges from about 1.0–1.5 or more. The acid leach ordinarily is carried out at a temperature of up to about 140° C., and preferably from about 100 to about 140° C. This operation extracts the bulk of the beryllium values from the roast cake into the acidic phase. Essentially complete removal of the solubilized beryllium from the cake is achieved by subsequent water washes, these ordinarily being added to the acidic extract.

The dissolved, oxidized beryllium values contained in the acidic extract readily are recovered therefrom. The solution can be concentrated to crystallize the corresponding salt or evaporated to dryness to precipitate the salt. The solution can be neutralized to precipitate the beryllium as the hydroxide and this then be converted to the oxide or other compounds for example. Other means of recovery as are apparent to one skilled in the art can be employed. Further, it is to be understood that the recovered beryllium compounds can be employed directly or used in the production of other materials by subjecting these to appropriate subsequent reactions.

Temperatures higher than 350° C. can be employed for the initial reaction of the base material-beryllium source mixture if desired although such higher temperatures are not required for satisfactory operation of the process. Lower reaction temperatures than set forth also can be used. However, at lower temperatures for high beryllium recoveries the reaction time is extended beyond the indicated period.

The base-beryllium source material reaction readily is carried out at atmospheric pressure. However, by employing a closed reactor system and utilizing elevated pressures of from about 20 to about 50 pounds per square inch gauge with solutions or slurries of the base material reactant the reaction mass is maintained in a slurry form thereby offering ready ease of subsequent separation and recovery of the roast cake. At atmospheric pressure, the base material-beryllium source admixture solidifies into a solid mass which is handled with somewhat more difficulty in subsequent stages of the process.

Base reagent to beryllium source ratios other than indicated can be employed. However, at lower ratios some decrease in yield of recoverable beryllium may be encountered and at higher ratios the economics of the process is adversely affected.

It is essential to the present process that the amount of acid employed be such so as to provide a leach of the pH range indicated. If acid in amounts other than set forth are employed a substantially nonfilterable slurry results and the beryllium values cannot readily be recovered. To illustrate, with sulfuric acid if an insufficient amount is employed so as to provide a pH higher than indicated, gelling results. Undesirable gelling also results if the acid concentration is too high so as to provide a pH lower than set forth hereinbefore.

An unexpected advantage of the present process is that sulfurous acid can be used as a satisfactory leachate for recovery of beryllium values. Because of the relatively mild reaction conditions, aqueous sulfurous acid unexpectedly provides for excellent beryllium recoveries. This acid which readily is produced by bubbling sulfur dioxide with an aqueous medium is particularly useful in that sulfur dioxide is inexpensive and recycle of $SO_2$ is possible by proper treatment of the $BeSO_3$ product.

In a preferred form of the present process, a mixture of beryl ore and sodium hydroxide, at a NaOH/beryl weight ratio of about 1.5, is heated at a temperature of from about 250 to about 350° C. for a period of from about 2 to about 4 hours. Ordinarily, in this preferred embodiment, the caustic soda is employed as an aqueous solution containing from about 50 to about 75 weight percent NaOH. Conveniently, this stage is carried out at an elevated pressure of from about 20 to about 50 pounds per square inch gauge.

The resulting roast cake is leached with water using from about 4 to about 10 parts by weight water per one part by weight of NaOH. As indicated hereinbefore, the amount of leach water is not critical as the prime purpose of this aqueous leach is to remove at least a portion of the excess NaOH thereby reducing the total amount of acid required in the subsequent acid leach.

Following the water wash, concentrated aqueous sulfuric acid of from about 50 to about 96% $H_2SO_4$ or sulfurous acid is added to the cake until the resulting reaction mass exhibits a pH of from about 3.5 to about 4.5.

Conveniently, sulfurous acid leachate can be produced in situ by bubbling $SO_2$ into an aqueous slurry of the water-washed roast cake. This latter procedure also provides a ready control of pH thereby assuring the maintenance of the critical reaction conditions.

The acid-roast cake mixture is maintained at a temperature of about 100° C. for about 2 to 4 hours.

The resulting beryllium containing acid leach is separated from the beryllium stripping cake. This cake ordinarily is washed with water to recover substantially all of the dissolved beryllium values.

The so-extracted beryllium values can be recovered from the aqueous sulfuric or sulfurous acid leach liquor as indicated hereinbefore.

The following examples will serve to further illustrate the present invention but are not meant to limit it thereto.

*Example 1*

About 20 grams of beryl, containing about 0.85 gram of oxidized beryllium was placed in a nickel crucible and mixed with about 30 grams of NaOH (NaOH/beryl ratio of 1.5/1). About 30 grams of water was added to give a smooth slurry. The crucible was placed in a furnace and heated at about 250° C. for about 4 hours. After cooling, the roast cake was removed from the crucible and leached for about ½ hour at room temperature with about 200 milliliters of an aqueous solution obtained from the same initial leach step in a previous run.

The slurry was filtered and about 30 milliliters of 50% $H_2SO_4$ (wt. $H_2SO_4$–21.0 g.) was added to the wet cake ($H_2SO_4$/beryl ratio about 1.1/1). This mixture was heated at about 100° C. for about 1 hour. The total weight of the roast cake-acid mixture was about 54 grams and contained substantially all of the beryllium originally present in the beryl, i.e. about 0.85 gram. The pH was about 3.69.

A sample (about 12.85 grams) of the roast cake-acid mixture containing about 0.208 gram of beryllium was extracted with about 50 milliliters of water at about 95° C. for about 30 minutes. The slurry then was rapidly filtered and the residue washed 3 times with 10 milliliter portions of water. The residual cake after being dried at about 110° C. was found to weigh about 3.7 grams. This cake contained about 0.019 gram of beryllium.

The combined acidic leach and wash solution had a volume of about 75 milliliters and contained about 0.189 gram of beryllium. Based on the original weight of beryllium in the ore sample, this indicated a beryllium recovery of about 91%.

*Example 2*

A number of runs were made to evaluate the effect of NaOH/ore weight ratios, reaction times and temperatures on the soluble beryllium recovered in the acid leach.

Beryl ore was mixed with caustic soda at a predetermined ratio and reacted for a given period of time at a set reaction temperature following the procedure set forth for Example 1. The resulting roast cake was then water washed and sulfuric acid leached and water extracted also in accordance with the procedure described in Example 1.

Table I which follows presents data showing the amount of beryllium solubilized and recovered in the final acid leach liquor based on the beryllium originally present in the beryl ore sample.

TABLE I

| Run No. | Wt. Ratio NaOH (beryl) | Reaction Temp.,° C. | Reaction Time, hrs. | Soluble Beryllium Recovered, Percent yield |
|---|---|---|---|---|
| 1 | 1 | 200 | 4.5 | 12 |
| 2 | 1 | 200 | 16 | 67 |
| 3 | 1 | 250 | 2 | 81 |
| 4 | 1 | 250 | 4 | 84 |
| 5 | 1 | 300 | 2 | 79 |
| 6 | 1.5 | 250 | 2 | 91 |
| 7 | 1.5 | 250 | 4 | 98 |
| 8 | 2.0 | 250 | 2 | 84 |
| 9 | 2.0 | 250 | 4 | 94 |

*Example 3*

Roast cakes were prepared by heating at temperatures in the range of from about 200 to about 300° C. for periods of from about 2 to about 4 hours aqueous solutions of sodium hydroxide containing about 50 weight percent NaOH and beryl ore at NaOH/beryl weight ratios of about 1.0–2.0. This ore had an initial Fe/Al/Be ratio of 0.35/2.7/1. The reacted mass was water washed and then extracted with sulfuric acid (about 50 to about 96% $H_2SO_4$) at varying $H_2SO_4$/beryl ratios to provide an acid leach of a predetermined pH. This study was carried out primarily to show the good recovery of beryllium from beryl as well as the gross separation of beryllium from iron and aluminum impurities obtained by practicing the present process. The effect of beryllium separation from iron and aluminum is particularly pronounced at the preferred acidic extract pH range. Table II summarizes the results of the study.

TABLE II

| Run No. | $H_2SO_4$/beryl Ratio | Acidic Leach, pH | Fe/Al/Be Ratio in Leach | Soluble Beryllium, Percent yield |
|---|---|---|---|---|
| 1 | ~1.0 | 0.88 | 0.29 /2.2 /1 | 81 |
| 2 | ~1.0 | 3.48 | 0.027/1.65/1 | 97 |
| 3 | ~1.0 | 3.69 | 0.03 /1.08/1 | 91 |
| 4 | ~1.0 | 4.18 | 0/0.29/1 | *76 |

*Apparent low yield resulted from attempt to obtain a high beryllium concentration in acidic leach by restricting volume of leach solution employed.

*Example 4*

A roast cake was prepared by heating at about 250° C. for about 4 hours an aqueous solution of sodium hydroxide containing about 50 percent by weight NaOH and beryl ore at a NaOH/beryl weight ratio of about 1.5. The resulting roast cake was water-leached and the fluids separated by filtration.

About 20.9 grams of the water-leached filter cake which contained about 0.40 gram of beryllium was mixed with about 30 milliliters water and heated to about 100° C. Sulfur dioxide was introduced into the aqueous slurry until a pH of about 2.4 was reached. The temperature of the mixture was gradually reduced to about 40° C. and held at this temperature for about 2 hours. After filtration and washing, the dried residue weighed about 7.9 grams and contained about 0.05 gram beryllium. This indicated about 88% of the beryllium in the ore was recovered in soluble form in the sulfurous acid leach.

In a manner similar to that described for the foregoing examples, beryl can be reacted with a mixture of potassium hydroxide and sodium carbonate, water leached and extracted with hydrochloric acid. Similarly, a mixture of cesium hydroxide and calcium oxide can be reacted with a beryllium ore to produce a roast cake and the beryllium values subsequently be recovered with a nitric acid leach.

Also rubidium oxide, or a mixture of potassium hydroxide and barium oxide, or a mixture of cesium hydroxide and potassium carbonate can be used to prepare a roast cake with beryl and the beryllium values recovered therefrom by leaching with aqueous sulfuric or sulfurous acid.

Any of the hereinbefore listed base reactants can be employed with a beryllium source either alone or as components of the base mixtures presented herein. Similarly, it is to be understood that any of the listed acid leach reagents can be satisfactorily employed with roast cakes resulting by reaction of beryllium ores and minerals with the base materials.

Various modifications can be employed in the present process without departing from the spirit or scope thereof for it is understood that I limit myself only as defined in the appended claims.

I claim:

1. In a process for recovering beryllium from beryllium source materials by reacting said source material with a base, digesting the residual mass with a mineral acid and recovering dissolved beryllium values the improvement which comprises;
   (a) admixing a beryllium source material with a base selected from the group consisting of alkali metal oxides, alkali metal hydroxides, mixtures of alkaline earth metal hydroxides and alkaline earth oxides and mixtures of alkali metal hydroxides and alkali metal carbonates, the ratio of said base to said beryllium source material being from about 1 to about 2, expressed as the ratio of NaOH equivalent to beryl,
   (b) heating the mixture at a minimum temperature of about 200° C. for a minimum period of about 1 hour,
   (c) extracting at a maximum temperature of about 140° C. the resulting solids with an aqueous mineral acid which does not complex beryllium, the amount of said acid employed providing a leach liquor of pH ranging from about 1 to about 4.5 thereby to produce a filterable slurry wherein the bulk of the beryllium from said beryllium source material is dissolved in the liquid acidic phase, and
   (d) separating the resulting acidic leach liquor containing said dissolved beryllium from the substantially beryllium depleted residual solid source material.

2. The process as defined in claim 1 and including the step of heating the base-beryllium source material mixture over a temperature range of from about 200° C. to about 350° C.

3. The process as defined in claim 1 and including the step of heating the base-beryllium source material mixture over a period of from about 1 to about 4 hours.

4. The process as defined in claim 1 and including the step of water leaching the base treated beryllium source material to remove excess base therefrom prior to extracting the solids with said aqueous mineral acid.

5. The process as defined in claim 4 and including the step of leaching the water-washed residual solids with a mineral acid selected from the group consisting of hydrochloric acid, hydrobromic acid, nitric acid, sulfuric acid and sulfurous acid.

6. The process as defined in claim 1 and including the step of washing the substantially beryllium depleted residual solid source material after separating this material from the acidic leach liquor.

7. In a process for recovering beryllium from beryl by reacting said beryl with a base, digesting the residual mass with a mineral acid and recovering dissolved beryllium values the improvement which comprises;
   (a) admixing beryl with sodium hydroxide at a NaOH/beryl weight ratio of about 1.5,
   (b) heating the admixture at a temperature of from about 250° C. to about 350° C. for a period of from about 2 to about 4 hours,
   (c) leaching the resulting roast cake with water to remove excess sodium hydroxide therefrom,
   (d) treating said roast cake at about 100° C. with aqueous sulfuric acid, said acid ranging in concentration from about 50 to about 96% $H_2SO_4$, the amount of said sulfuric acid employed providing a leach solution having a pH of from about 3.5 to about 4.5, said solution extracting the bulk of the beryllium from said roast cake and producing a filterable slurry of a beryllium containing acid leach and the substantially beryllium depleted roast cake, and
   (e) separating the beryllium containing acid leach from the substantially beryllium depleted roast cake.

8. The process as defined in claim 7 and including the step of admixing beryl with a solution of sodium hydroxide, said solution containing from about 50 to about 75 weight percent NaOH.

9. The process as defined in claim 8 and including the steps of washing the acid leached roast cake with water.

10. The process as defined in claim 8 and including the step of combining the water wash of the acid leached roast cake and the acid leach and recovering the beryllium values dissolved therein.

11. A process for recovering beryllium from beryl which comprises;
    (a) admixing beryl with a solution of sodium hydroxide at a NaOH/beryl weight ratio of about 1.5, said sodium hydroxide solution containing from about 50 to about 75 weight percent NaOH,
    (b) heating the admixture at a temperature of from about 250° C. to about 350° C. for a period of from about 2 to about 4 hours,
    (c) leaching the resulting roast cake with water to remove excess sodium hydroxide therefrom,
    (d) separating the water-leached roast cake from the sodium hydroxide containing aqueous leach,
    (e) slurrying said roast cake with water and heating said slurry to a temperature of about 100° C.,
    (f) bubbling sulfur dioxide therein to provide a sulfurous acid solution having a pH of from about 3.5 to about 4.5, said solution extracting beryllium values from said roast cake, and
    (g) separating said sulfurous acid leach solution containing the dissolved beryllium values from the beryllium depleted roast cake.

12. The process as defined in claim 11 and including the step of washing the acid leached cake with water thereby to recover substantially all of the dissolved beryllium values therefrom.

References Cited

UNITED STATES PATENTS

| | | | |
|---|---|---|---|
| 1,656,660 | 1/1928 | Brush | 23—24.2 |
| 1,982,873 | 12/1934 | James | 23—24.2 |
| 1,991,269 | 2/1935 | Armstrong | 23—24.2 |

OSCAR R. VERTIZ, *Primary Examiner.*

H. T. CARTER, *Assistant Examiner.*